US010740877B2

(12) United States Patent
Dey et al.

(10) Patent No.: US 10,740,877 B2
(45) Date of Patent: Aug. 11, 2020

(54) MEDICAL IMAGE PROCESSING

(71) Applicant: KONINKLIJKE PHILIPS N.V., Eindhoven (NL)

(72) Inventors: Thomas Dey, Aachen (DE); Andreas Goedicke, Aachen (DE); Andre Frank Salomon, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 123 days.

(21) Appl. No.: 16/082,663

(22) PCT Filed: Apr. 5, 2017

(86) PCT No.: PCT/EP2017/058060
§ 371 (c)(1),
(2) Date: Sep. 6, 2018

(87) PCT Pub. No.: WO2017/174627
PCT Pub. Date: Oct. 12, 2017

(65) Prior Publication Data
US 2019/0080438 A1 Mar. 14, 2019

(30) Foreign Application Priority Data
Apr. 5, 2016 (EP) .................................. 16163873

(51) Int. Cl.
*G06T 5/00* (2006.01)
*G06T 11/00* (2006.01)
(52) U.S. Cl.
CPC ............ *G06T 5/002* (2013.01); *G06T 11/006* (2013.01); *G06T 2207/10104* (2013.01)
(58) Field of Classification Search
CPC .................. G06T 5/002; G06T 11/006; G06T 2207/10104
(Continued)

(56) References Cited

U.S. PATENT DOCUMENTS 8,059,905 B1 11/2011 Christian
9,498,177 B2 * 11/2016 Bruder ................... A61B 6/032
(Continued)

FOREIGN PATENT DOCUMENTS

EP 2653106 10/2013
WO 2015/162519 10/2015

OTHER PUBLICATIONS

Anonymous: Edge Detection—Wikipedia, Nov. 30, 2015, Retrieved from the Internet: URL:https://en.wikipedia.org/wiki/Edge_detection.
(Continued)

*Primary Examiner* — Shahriar Behnamian

(57) ABSTRACT

Patient imaging systems, such as PET imaging systems, for example, may suffer from the introduction of artificially introduced noise. This noise is, typically, introduced during iterations of reconstruction algorithms, such as the least-squares algorithms, which attempts to recreate a 2D or a 3D image from raw acquisition information. The noise appears as "hot-spots" in the reconstructed image. Approaches to address these artefacts use filtering approaches. Typically, a least-squares reconstruction is supplemented with a penalty term, an approach known as "Relative Difference Penalty". The penalty parameter causes the reconstruction algorithm to filter more or less strongly at certain regions of the reconstruction. The present application proposes an approach which supplements the penalty term with continuous probability information about the likelihood of an edge being present in a portion of an image.

14 Claims, 5 Drawing Sheets

(56) References Cited

U.S. PATENT DOCUMENTS

| | | | | |
|---|---|---|---|---|
| 9,524,567 | B1* | 12/2016 | Brokish | G06T 11/006 |
| 9,730,607 | B2* | 8/2017 | Garber | A61B 5/0536 |
| 2006/0215891 | A1 | 9/2006 | Fessler | |
| 2006/0279585 | A1* | 12/2006 | Milanfar | G06T 3/4015 |
| | | | | 345/694 |
| 2011/0293158 | A1* | 12/2011 | Popescu | A61B 5/055 |
| | | | | 382/131 |
| 2014/0126793 | A1 | 5/2014 | Ahn | |
| 2016/0117800 | A1* | 4/2016 | Korkin | H04N 5/2258 |
| | | | | 348/239 |

OTHER PUBLICATIONS

Ma, et al., "LBP-based penalized weighted least-squares approach to low-dose cone-beam computed tomography reconstruction", Progress in Biomedical Optics and Imaging, SPIE—International Society for Optical Engineering, vol. 9033, Mar. 19, 2014.

Kim, et al., "Automatic edge detection using 3×3 ideal binary pixel patterns and fuzzy-based edge thresholding", Pattern Recognition Letters, Elsevier, vol. 25, No. 1, Jan. 5, 2004.

Guo, et al., "A Completed Modeling of Local Binary Pattern Operator for Texture Classification", IEEE TRansactions on Image Processing, vol. 19, No. 6, Jun. 1, 2010.

Asma, et al., "Quantitatively Accurate Image Reconstruction for Clinical Whole-Body PET Imaging", Proceedings of the 2012 Asia Pacific Signal and Information Processing Association Annual Summit and Conference, Dec. 2012.

Wang, et al., "Penalized Likelihood PET Image Reconstruction using Patchbased Edge-preserving Regularization", IEEE Trans Med Imaging. Dec. 2012; 31(12): 2194-2204.

Li, et al., "Local Binary Patterns and Extreme Learning Machine for Hyperspectral Imagery Classification", IEEE Transactions on Geoscience and Remote Sensing, vol. 53, No. 7, Jul. 2015.

* cited by examiner

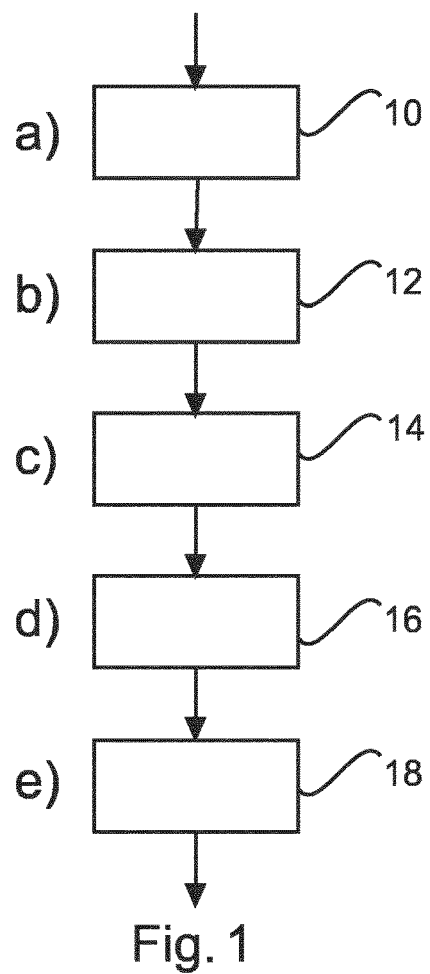
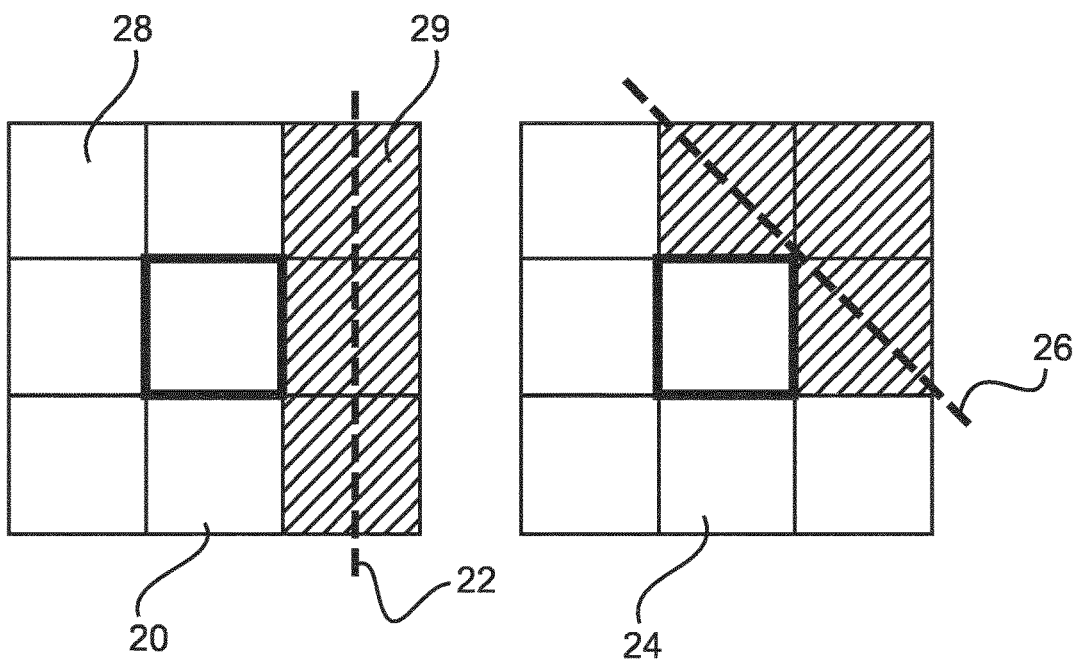

MEDICAL IMAGE PROCESSING

CROSS REFERENCE TO RELATED APPLICATIONS

This application is the U.S. National Phase application under 35 U.S.C. § 371 of International Application No. PCT/EP2017/058060, filed Apr. 5, 2017, published as WO 2017/174627 on Oct. 12, 2017, which claims the benefit of European Patent Application Number 16163873.9 filed Apr. 5, 2016. These applications are hereby incorporated by reference herein.

FIELD OF THE INVENTION

The invention relates to a device for artificial noise suppression in iterative image reconstruction, a method for artificial noise suppression in iterative image reconstruction, a medical imaging system, a computer program element, and a computer-readable medium.

BACKGROUND OF THE INVENTION

Iterative image reconstruction approaches are widespread in the field of medical image reconstruction, such as, for example, the reconstruction of PET, and/or PET/CT images. Compared to analytical (one-pass) approaches, iterative image reconstruction techniques allow for the statistical nature of the acquired data to be taken into account, in order to reduce artefacts that degrade the image quality. For each iteration, the acquired detector signal is compared to the application of a system model to a current estimate of the image data, until a predefined stop criterion is reached.

Such an approach is particularly suitable to the reconstruction of PET tracer signals, where, owing to the nature of PET signal detection, the signal to noise ratio is low compared to other imaging modalities. An iterative approach can lead to the emergence of clusters of noise in the image as the reconstruction progresses.

Present image reconstruction approaches often do not take into account that the image data represents a biological structure, and so opportunities for improving the reconstructed image are, currently, missed.

The article "LBP-based penalized weighted least-squares approach to low-dose cone-beam computed tomography reconstruction" by Ma, et. al., published in Proc. SPIE Vol. 9033 903336-1, "Medical Imaging 2014: Physics of Medical Imaging" edited by Whiting, et. al., doi: 10.1117/12.2043289 concerns an iterative image reconstruction approach. In this approach, a least-squares reconstruction is provided having a penalization term. Such approaches can, however, be further improved.

SUMMARY OF THE INVENTION

It would, thus, be advantageous to have a technique for providing an improved artificial noise suppression technique.

The object of the present invention is solved by the subject-matter of the independent claims, wherein further embodiments are incorporated in the dependent claims.

These, and other aspects of the present invention will become apparent from, and be elucidated with reference to, the embodiments described hereinafter.

According to a first aspect of the invention, there is provided a device for artificial noise suppression in iterative image reconstruction. The device comprises a processing unit.

The processing unit is configured to acquire image precursor information, to generate (i) edge pattern information of the image precursor information using an edge pattern detector, and (ii) noise pattern information, and to generate edge preservation parameter information based on the edge pattern information, the noise pattern information, and the image precursor information.

The edge preservation parameter information is based on a continuous probability measure. The processing unit is configured to generate a regularization function, wherein the regularization function is locally adjusted using the edge preservation parameter information, and to generate reconstructed image information by applying an image reconstruction algorithm to the image precursor information.

The image reconstruction algorithm applies the regularization function R to the image precursor information $\lambda_i$, thus providing reconstructed image information $\lambda_{i+1}$ in which noise-correlated features of the image precursor information $\lambda_i$ have been filtered more strongly than edge-correlated features of the image precursor information $\lambda_i$.

Therefore, large local voxel differences in an image originating from clustered noise speckles (which are not wanted in a final image) may be removed, whilst at the same time, small local voxel differences representing physiologically significant edge features (which are wanted in an final image) may be preserved. A statistical model is used to determine how well a found pattern matches a general feature (edge) model and noise model, which also considers local statistical variations in the image precursor information. The use of a statistical model enables the edge preservation parameter information to be a continuous function, because the edge preservation parameter information may be, for example, sampled from one or more probability density functions.

Accordingly, a more accurate distinction between clustered noise speckles and physiology-based features is possible.

According to an embodiment of the first aspect, the edge pattern detector is configured to apply one, or more edge models to the image precursor information. The edge models comprise a reference edge model which is a prototype spatial distribution model of a subset of image pixels or voxels which can be used to statistically indicate the likelihood of the presence of a feature edge in the image precursor information.

Optionally, the processing unit is further configured to generate the edge pattern information by obtaining reference edge pattern information based on one or more binary edge patterns, and to compute edge detection information by applying the reference edge pattern information to the image precursor information.

Edge patterns provide an efficient way of tracking the presence of edges, whilst also being amenable to reduced-complexity processing approaches.

According to an embodiment of the first aspect, the processing unit is further configured to generate the edge pattern information by computing sign binary pattern information from the image precursor information, and difference binary pattern information from the image precursor information. The sign binary pattern information distinguishes between a positive and negative difference of each neighbourhood pixel or voxel when compared to the image precursor information. The difference binary pattern information distinguishes pixels having a intensity difference relative to a central pixel or voxel in the neighbourhood pixels or voxels which is greater than a difference threshold.

Therefore, it is possible to introduce additional evidence about the edge and noise status of the voxels into the prior term of the first aspect.

Optionally, the processing unit is further configured to generate the edge pattern information by computing sign binary pattern information from the image precursor information; and to generate difference binary pattern information from the image precursor information.

According to an embodiment of the first aspect, the processing unit is configured to generate a plurality of classes comprising pixel or voxel incidence information for each class, wherein each class of the plurality of classes is formed based on a logical combination of matching bits of at least two of the edge pattern information, the difference binary pattern information, and sign binary pattern information.

Therefore, the prior term of the first aspect is much closer to being an optimal estimator of the edge and/or noise status of a voxel, owing to the application of statistical principles to the binary patterns.

Optionally, the processing unit is further configured to combine the edge pattern information, the difference binary pattern information, and the sign binary pattern information to obtain an edge probability measure.

According to an embodiment of the first aspect, the processing unit is configured to generate an edge probability measure based on the number of pixels or voxels in each class of the plurality of classes, and the probability of each class.

Therefore, the spatial distribution pattern created by surrounding voxels may be taken into account as an additional criterion in a noise/feature separation decision.

According to an embodiment of the first aspect, the processing unit is further configured to calculate the edge preservation parameter information using the edge probability measure.

According to an embodiment of the first aspect, the processing unit is further configured to obtain a plurality of reference noise patterns as the noise pattern information. The edge preservation parameter information is generated additionally by combining the plurality of reference noise patterns with the edge pattern information.

Therefore, the probability that a specific voxel represents an edge or a noise element may be generated under the combined hypothesis of the presence of an edge voxel, and a noise voxel.

According to an embodiment of the first aspect, the processing unit is further configured to generate, for elements of the image precursor information, a noise probability value as the sum of the products of the noise probabilities of respective classes of the plurality of classes, and their noise probabilities.

Therefore, the regularization term may be provided with a more accurate set of noise statistics.

According to an embodiment of the first aspect, the processing unit is further configured to generate the edge preservation parameter information by finding, for each voxel, the probability ratio of the probability of an edge to the probability of noise, and to sum the probability ratio to form a summed ratio as initial edge preservation parameter information.

According to an embodiment of the first aspect, the processing unit is further configured to limit the initial edge preservation parameter information using an exponential or a sigmoid function to form the edge preservation parameter information.

Therefore, the edge preservation parameter information is provided in an arithmetically limited range.

According to a second aspect of the invention, a method for artificial noise suppression in iterative image processing is provided. The method comprises:

a) acquiring image precursor information $\lambda_i$;
b) generating (i) edge pattern information of the image precursor information $\lambda_i$ using an edge pattern detector, and (ii) noise pattern information;
c) generating edge preservation parameter information γ based on the edge pattern information, the noise pattern information, and the image precursor information $\lambda_i$, wherein the edge preservation parameter information γ is based on a continuous probability measure;
d) generating a regularization function R, which is locally adjusted using the edge preservation parameter information γ; and
e) generating reconstructed image information $\lambda_{i+1}$ by applying an image reconstruction algorithm to the image precursor information $\lambda_i$.

The image reconstruction algorithm applies the regularization function R to the image precursor information $\lambda_i$, thus providing reconstructed image information $\lambda_{i+1}$ in which noise-correlated features of the image precursor information $\lambda_i$ have been filtered more strongly than edge-correlated features of the image precursor information $\lambda_i$.

According to the method of the second aspect, a more accurate distinction between clustered noise speckles and physiology-based features is possible during the reconstruction of images.

According to an embodiment of the second aspect, the step of generating the edge pattern information further comprises using the edge pattern detector to apply one, or more edge models to the image precursor information. The edge models comprise a reference edge model which is a prototype spatial distribution model of a subset of image pixels or voxels which can be used to statistically indicate the likelihood of the presence of a feature edge in the image precursor information.

Optionally, step c) of the method further comprises generating the edge pattern information by:

c1) obtaining reference edge pattern information based on one or more binary edge patterns; and
c2) computing edge detection information by applying the reference edge pattern information to the image precursor information.

According to a third aspect of the invention, a medical imaging system is provided. The system comprises:

a patient imaging arrangement;
a display unit; and
a device for artificial noise suppression in iterative image reconstruction as defined in the first aspect, or its embodiments.

The patient imaging arrangement comprises an imaging sensor configured to provide image information of a region of interest of a patient to the device for image reconstruction.

The display unit is configured to display reconstructed image information output by the device for image reconstruction.

Therefore, a medical imaging system providing a more accurate distinction between clustered noise speckles and physiology-based features is provided.

According to a fourth aspect of the invention, there is provided a computer program element for controlling a device for image reconstruction according to the first aspect, or one of its embodiments, which, when the computer program element is executed by a control unit, is adapted to perform the steps of the second aspect, or one of its embodiments.

According to a fifth aspect of the invention, there is provided a computer readable medium having stored the program element the fourth aspect.

It will be appreciated that the algorithm has wide applicability in the field of image reconstruction. 2D, 3D, or images of higher dimensions may be processed according to the algorithm discussed herein. Therefore, the terms "pixels" and "voxels" are interchangeably used in the description and claims without loss of generality.

In the following specification, the term "image precursor information" means raw image information from an imaging modality, and/or image information which is in the process of being reconstructed. The image precursor information may be volume information from a CT, MRI, and/or PET reconstruction approach. The image precursor information comprises voxels of a region of interest of a patient.

In the following specification, the term "edge pattern information" means one, or a plurality, of voxel sets representing a neighbourhood comprising a feature edge, or edges. Typically, the edge pattern information may comprise (in a 2D case) a binary grid having a centre voxel, and a surrounding example edge pattern. A "no-edge" voxel is represented by a logic 0, and an "edge" voxel is represented by a logic 1. The grid or grids comprised in the edge pattern information is/are compared successively to voxels of the image precursor information as centre voxels are iterated through the image precursor information. Thus, for each item of edge pattern information and each centre voxel, a similarity measure of the chosen centre voxel to a candidate edge pattern in the edge pattern information is formed. Edges so represented may be a line end, a corner, or a flat section, for example.

In the following specification, the term "noise pattern information" analogously to "edge pattern information", means one, or a plurality, of voxel sets representing the form of a noise pattern. The voxels of the image precursor information may be iterated through, with the noise pattern information being compared for similarity to the neighbourhood of a considered centre voxel in the image precursor information.

In the following specification, the term "edge pattern detector" means an algorithm applying one, or a plurality, of edge patterns to identify the likelihood of an edge pattern being present at a considered voxel of the image precursor information.

In the following specification, the term "edge preservation parameter information" means a parameter provided in a relative difference penalty reconstruction scheme used to control a transition point between treating intensity differences in the local image precursor information as features (which are less penalized) or noise (which are more penalized). Thus, the edge preservation parameter information may be tailored during iterations of the reconstruction to enhance edge information and to cancel noise information. As an example, the edge preservation parameter information is defined for each voxel in the "last" iteration of a reconstruction algorithm, providing information for the "next" iteration of the reconstruction algorithm about which voxels to emphasize or to attenuate.

In the following specification, the term "regularization function" means a penalizer-term (prior) added to an iterative image reconstruction scheme, which considers the characteristics of a surrounding voxel neighbourhood during a local voxel update, as a control (or weighting) parameter.

Therefore, in an iterative image reconstruction scheme (such as a least squares approach) applied, for example, to a medical imaging approach, it is a basic idea to apply a relative difference penalty term to the iterative image reconstruction scheme, in which the relative difference penalty term comprises an edge emphasizing parameter. This may retain the presence of edges in a reconstructed image iteration, and/or de-emphasize noise patches in a reconstructed image iteration.

Thus, structures in an image resulting from biological information such as organs and bones are reconstructed in a more visually accurate way, because artificially generated noise artefacts are more effectively suppressed. The edge emphasizing parameter is a continuous function, generated from a statistical likelihood that an observed voxel is part of an edge feature, or a noise feature, of an image undergoing reconstruction.

BRIEF DESCRIPTION OF THE DRAWINGS

Exemplary embodiments will be described with reference to the following drawings:

FIG. 1 shows a method according to the second aspect.

FIG. 2 shows two possible edge patterns.

DETAILED DESCRIPTION OF EMBODIMENTS

The iterative reconstruction of images from image precursor information is a general problem applicable many imaging modalities, such as computed tomography (CT), Magnetic Resonance Imaging (MRI), Positron Emission Tomography (PET), and others.

As an example, PET image reconstruction is a focus of particular interest, because PET produces images with a low signal to noise ratio. This is due to the physical aspects unique to PET detection, which will briefly be explained.

Transmission X-ray imaging approaches, where an X-ray of controllable intensity is directed through a target, enable an improvement in SNR by increasing the power in the X-ray beam, or by improving the detector electronics, for example. In PET imaging, however, the origin of the image is via a radioactive tracer, attached typically to a sugar, which is introduced into a patient's bloodstream shortly before imaging.

Metabolic processes cause the uptake of the tracer. The higher metabolic rates typically present in a cancerous growth lead to a faster rate of radioactive tracer into the cancerous growth.

Positron decay and annihilation processes caused by metabolism of the substrate of the radioactive tracer results in the emission of a combination of a positron with a free electron in the imaged media. This "positronium" decays by annihilation, causing two gamma rays to travel in approximately opposite directions from the decay each with an energy of 511 keV. These "pair" decays can be detected using coherently sampled, collinearly arranged detectors. The more genuine "pair" decays are detected from a segment of tissue, the more metabolically active the segment of tissue is perhaps indicating the likelihood of a tumour.

Current PET reconstruction approaches attempt to penalize local statistical variations, but to preserve "real" characteristics such as edges in the acquired data. This is achieved using a technique called "regularization", which uses evidence-based noise-feature differentiation. Commonly used approaches apply edge-preserving prior terms, which emphasize larger local differences over smaller ones under the assumption such features have a higher probability of belonging to organ or feature boundaries.

Figure 5:
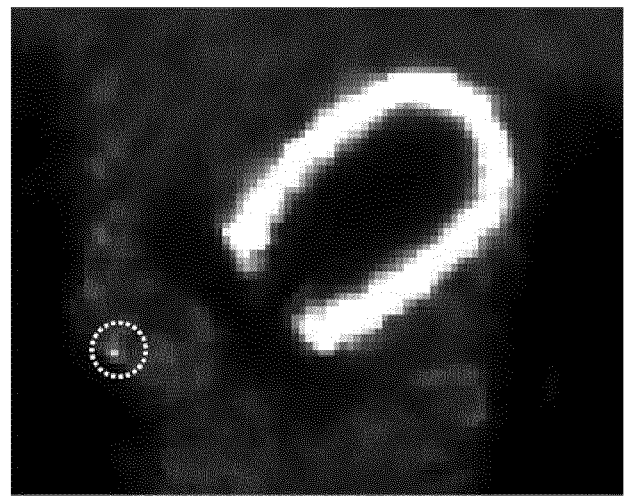
FIG. 5 shows a medical image phantom, and an unwanted noise artefact.

A problem with many current PET image reconstruction approaches using edge-preserving priors is illustrated in FIG. 5. In FIG. 5, a horseshoe-shaped medical phantom representing an organ in a phantom myocardium is displayed. However, an un-physiological "hot-spot" (shown in the dotted ring) is also present in the reconstructed image. This is caused because noise-originating local voxel differences can be preserved during reconstruction, leading to artefacts in the image.

In the clinical field, such artefacts can be misinterpreted as small lesions, having a consequence on a medical diagnosis. However, small differences which are caused by real edges, such as tumours in PET, may be penalized, and thus vanish during image reconstruction.

Therefore, further effort is required to increase the evidence available for detecting and identifying features in such PET images.

The present aspects propose a modified evaluation scheme, which also takes into account the spatial distribution pattern created by surrounding voxels as additional criteria for the noise versus feature separation decision. According to the aspects discussed below, it is proposed to use a statistical model to determine how well a discovered pattern matches a general edge model, which also considers local (statistical) variations in the image. The statistical model is used to provide edge preservation parameter information based on a continuous probability measure.

Thus, according to a first aspect of the invention, there is provided a method for artificial noise suppression in iterative image reconstruction, comprising:
a) acquiring image precursor information $\lambda_i$;
b) generating (i) edge pattern information of the image precursor information $\lambda_i$ using an edge pattern detector, and (ii) noise pattern information;
c) generating edge preservation parameter information γ based on the edge pattern information, the noise pattern information, and the image precursor information $\lambda_i$,
wherein the edge preservation parameter information γ is based on a continuous probability measure;
d) generating a regularization function R, which is locally adjusted using the edge preservation parameter information γ; and
e) generating reconstructed image information $\lambda_{i+}1$ by applying an image reconstruction algorithm to the image precursor information $\lambda_i$.

The image reconstruction algorithm applies the regularization function (R) to the image precursor information $\lambda_i$, thus providing reconstructed image information ($\lambda_{i+1}$) in which noise-correlated features of the image precursor information $\lambda_i$ have been filtered more strongly than edge-correlated features of the image precursor information X.

FIG. 1 illustrates the method according to the first aspect.

The method according to the first aspect provides a technique for providing the prior information used in the regularization term of an image reconstruction algorithm (such as the penalized weighted least squares algorithm). The method applies a statistical model to image precursor information X to determine how well a pattern discovered in an image undergoing reconstruction matches a general edge model in, the presence of one or more noise patterns. Features in the image precursor information more likely to have been caused by noise effectively have a stronger spatial filter applied to them, compared to features in the image precursor information which are more likely to have been caused by an edge feature from a physiological artefact. Thus, a more accurate distinction between clustered noise speckles and physiology-based features is possible.

There follows a detailed description of an implementation example of an algorithm according to the first aspect. The skilled person will appreciate that other variations of the algorithm may be provided.

The implementation example applies an iterative image reconstruction scheme within the framework of the relative difference penalty approach (RDP). This approach is further discussed at section E of the article "Quantitatively Accurate Image Reconstruction for Clinical Whole-Body PET Imaging", by E. Asma et. al, as published in the proceedings of the Signal & Information Processing Association Annual Summit and Conference (APSIPA ASC), 2012 Asia-Pacific, 3-6 Dec. 2012, pages 1-9, ISBN 978-1-4673-4863-8.

$$R = -\beta \sum_{j=1}^{n_v} \sum_{k \in N_j} \frac{\omega_j \omega_k (\lambda_j - \lambda_k)^2}{(\lambda_j + \lambda_k) + \gamma |\lambda_j - \lambda_k|} \quad (1)$$

In equation (1), β is a global control parameter, which scales the strength of the penalizing term R in comparison to the likelihood of the image estimate. $n_v$ represents the total number of voxels in the 3D (or 2D) image. $N_j$ refers to the neighbourhood of a considered voxel. Parameters $\omega_j$ and $\omega_k$ are weights specifying how a chosen neighbourhood voxel contributes to the strength of the penalty R. The terms $\lambda_j$, and $\lambda_k$ represent the voxel intensities for specific chosen voxels $\lambda_j$, and specific neighbourhood voxels $\lambda_k$ relating to the chosen voxels. The parameter γ is an edge-preservation level parameter.

The edge-preservation level parameter (edge preservation parameter information γ) has an important effect in the algorithm, because dependent on the choice of γ, the overall RDP penalty term R behaves, for example, as a combination of a quadratic penalty with activity dependent smoothing, and/or an edge-preserving generalized Gaussian penalty.

In other words, the choice of γ controls the transition point between treating local image intensity differences either as features which should be preserved (in which case, the RDP term R should, locally, have a less-penalizing effect), or as noise which should be cancelled (in which case, the RDP term R should, locally, have a more noise-penalizing effect).

Thus, the choice of the γ term is important to the determination of the RDP penalty term. In summary, it is proposed according to the present aspects of the invention to provide an algorithm which provides γ as a continuous, statistically derived variable, where γ is calculated based on edge pattern information generated using an edge pattern detector applied to image precursor information.

The edge pattern detector is applied to intermediate image reconstruction results (image precursor information X) during iterations of an image reconstruction algorithm, for example the least-squares algorithm. The edge pattern detector provides correction factors as a continuous probability measure, which tailors the edge-preserving parameter γ locally during image reconstruction.

The term "continuous probability measure" is used in the sense that an arbitrarily small change in the characteristics of the image precursor information λ results in an arbitrarily continuous change in the edge-preserving parameter γ, which is determined by a statistical distribution or process.

In other words, the edge-preserving parameter γ is determined using a statistical combination of edge pattern information generated using an edge pattern detector and noise pattern information, applied to image precursor information.

Once the edge preserving parameter γ (edge preservation parameter information γ) has been provided, the regularization function (RDP penalty term) R for the image is generated, and may be applied to the relevant image reconstruction iteration.

Optionally, the process outlined above may be iterated one, or more times with the previous result of the image reconstruction iteration forming the image precursor information λ for a subsequent iteration.

The edge preservation approach discussed above results in an improved edge-preservation during an image reconstruction, because the edge preserving parameter γ applied to the regularizing term is a continuous variable derived according to a comparison of pre-defined edge models (and at least one noise models) with the image precursor information λ. In practice, the pre-defined edge models are implemented as patterns, such as binary patterns.

Optionally, the comparison of pre-defined edge models (and optionally noise models) with the image precursor information X is a statistical comparison. Thus, the edge preserving parameter γ (edge preservation parameter information γ) is a more statistically optimal edge-preserving parameter compared to known approaches.

An example implementation of the algorithm will now be discussed, although the person skilled in the art will appreciate that there are many different ways to implement an edge-preserving algorithm according to the algorithm framework stated above. In the example, reference is made to a two-dimensional case of the algorithm, but it will be appreciated by the person skilled in the art that this is generalizable to a three, or more, dimensional case.

A top-level explanation of the implementation example is that:
(i) An edge pattern detector applies one, or a plurality of binary edge models, and at least one noise pattern, to each voxel of the image precursor information.
(ii) A difference binary pattern of each voxel of the image precursor information is found.
(iii) A sign binary pattern of each voxel of the image precursor information is found.
(iv) A number of classes are formed based on all possible logical combinations of bits of the binary edge patterns, the difference binary patterns, and the sign binary patterns, where each class of the number of classes has a different probability distribution.
(v) The overall conditional probability that a considered pattern can be explained by a given reference edge pattern, is found by combining as products the probability of each class. The conditional probability for a match with one (or more) noise-representing reference pattern(s) is found similarly. Optionally, the classes may be sub-sampled (in other words, fewer classes than all possible logical combinations of the difference, sign, and edge binary patterns are used to form the overall conditional probability.
(vi) Finally, to find the edge preservation parameter information γ for a given central voxel indicating whether the likelihood of whether or not the voxel belongs to an edge, the ratio between the edge conditional probability, and the noise conditional probability, is calculated.

It will be appreciated that other example algorithms applying an edge pattern detector could be applied to steps (i)-(vi). Of course, steps (i), (ii), and (iii) may be performed in any order without a loss of generality.

In an example, the edge-preserving parameter γ is determined using a statistical combination of edge pattern information generated using an edge pattern detector, applied to image precursor information. The edge pattern detector applies one, or more edge models to the image precursor information.

According to a first step of the example, a reference edge model is provided.

Optionally, a plurality of reference edge models are provided. One noise pattern is also provided. Optionally, a plurality of noise patterns are provided.

The reference edge model is a prototype spatial distribution model of a subset of image voxels which can be expected to statistically indicate the likelihood of the presence of a feature edge.

Optionally, the reference edge model is provided as a "local binary pattern". This is a fine-scale description of image texture. A centre voxel "$t_c$" is denoted, and each neighbour in the region of the centre pixel is assigned with a binary label, dependent on certain criteria. A simple criterion is to label a selected neighbourhood pixel with a "1" if the selected neighbourhood pixel is larger in magnitude than the central pixel, and a "0" if the selected neighbourhood pixel is smaller in magnitude than the central pixel.

The noise pattern is a randomly-generated pattern representing a noise characteristic in the edge pattern area (based on a Gaussian statistic, for example).

Thus, in step (i) of the implementation example, a specific binary edge model $b_{edge}$ is applied, in turn, to each voxel in the image precursor information. The level of agreement between the voxel neighbourhoods, the specific binary edge model $b_{edge}$, and the at least one noise pattern is found. The result of the application of the binary edge model and the noise model to each voxel should be stored for further use.

Optionally, a plurality of different binary edge models is applied to the image precursor information. In this case, the results of the application of the plurality of binary edge models to each voxel are stored for further use. Optionally, a binary noise model, or a plurality of them, is applied to the image precursor information, and in turn these are stored for further use.

Thus, using the edge pattern detector, a measure of "agreement" between the voxel neighbourhoods to the one or more binary edge models (and the at least one noise model) is provided.

In the second step (ii) of the implementation example, a difference binary pattern $b_{diff}$ is found for each considered voxel. One approach to find $b_{diff}$ is to find an expected variation $\sigma_{voxel}$ of a considered voxel is derived from the image precursor information $\lambda$ directly (for example, via the square root of the mean value of the neighbouring voxel intensities. Alternatively, another measure, such as the Fisher information of the image precursor information may be used.

Then, a scaling factor $\sigma_{scaling}$ is chosen, potentially in a wide range (e.g. 0-5, dependent on the computational resources available and the expected variation in image intensity). A difference threshold is defined as $\sigma = \sigma_{scaling} \cdot \sigma_{voxel}$. To obtain the difference binary pattern $b_{diff}$, the differences of all neighbouring voxels to the central one are compared to the $\sigma = \sigma_{scaling} \cdot \sigma_{voxel}$ threshold, according to equation (2):

$$b_{diff}(\lambda_c, \lambda_i) = \begin{cases} 1 & \text{if } |\lambda_c - \lambda_i| \geq \sigma \\ 0, & \text{otherwise} \end{cases} \quad (2)$$

In equation (2), the term $\lambda_c$ represents the intensity value of the considered central voxel of a neighbourhood. The term $\lambda_i$ represents the intensity value of the considered neighbouring voxel. As previously, the difference binary patterns $b_{diff}$ for each of the considered central voxels over the image are saved for subsequent processing.

In the third step (iii) of the implementation example, a sign binary pattern $b_{sign}$ of each voxel of the image precursor information is found. The sign binary pattern $b_{sign}$ is derived to distinguish between the positive and negative differences of the neighbourhood voxels, as defined in equation (3):

$$b_{sign}(\lambda_c, \lambda_i) = \begin{cases} 1 & \text{if } (\lambda_c - \lambda_i) \geq 0 \\ 0, & \text{otherwise} \end{cases} \quad (3)$$

In equation (3), the term $\lambda_c$ represents the intensity value of the considered central voxel of a neighbourhood. The term $\lambda_i$ represents the intensity value of the considered neighbouring voxel.

In step (iv) of the implementation example, a number of classes are formed based on a logical (Boolean) combination of matching bits of the edge binary patterns, the difference binary patterns, and the sign binary patterns, where each class of the number of classes has a number of different probability distributions, as shown in equation (4):

$$C_1 = b_{edge} \cdot b_{diff} \cdot b_{sign}$$

$$C_2 = b_{edge} \cdot b_{diff} \cdot \overline{b_{sign}}$$

$$C_3 = b_{edge} \cdot \overline{b_{diff}} \quad (4)$$

$$C_4 = \overline{b_{edge}} \cdot b_{diff} \cdot b_{sign}$$

$$C_5 = \overline{b_{edge}} \cdot b_{diff} \cdot \overline{b_{sign}}$$

$$C_6 = \overline{b_{edge}} \cdot \overline{b_{diff}}$$

The edge probability is calculated based on the number of voxels in the classes $C_i$ of (4), and the probability of each class $p_i$.

Figure 4A:
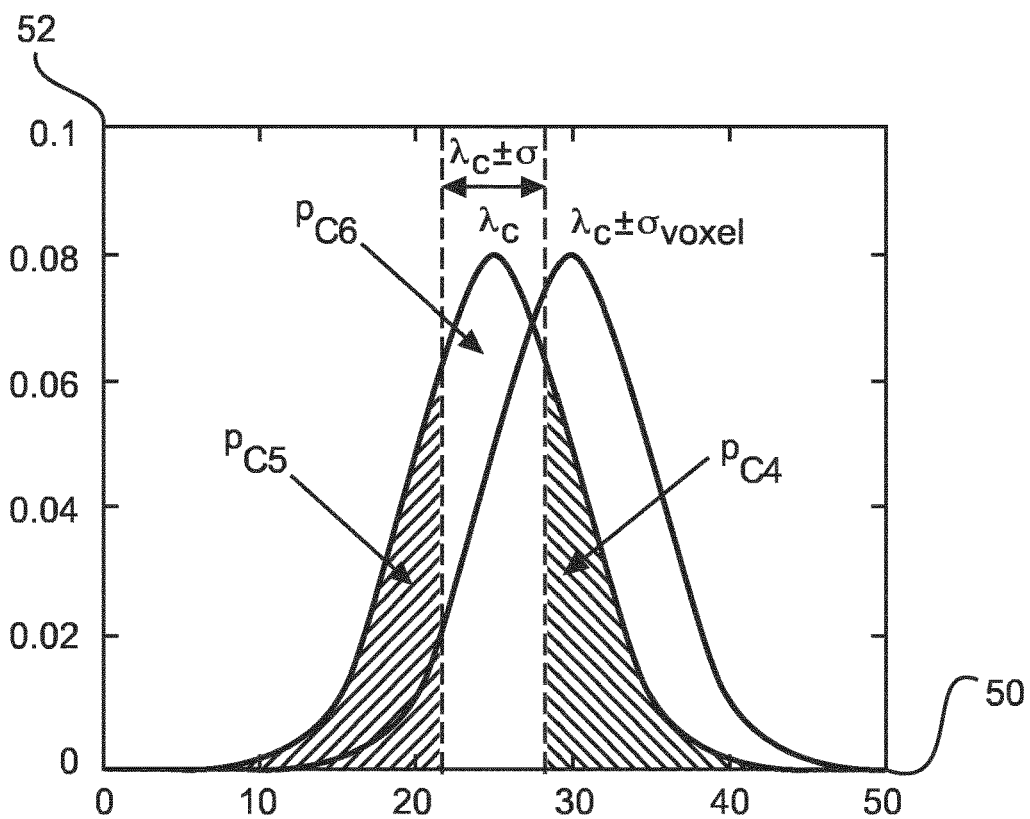
FIGS. 4a and 4b show statistical distributions of class probabilities used in the algorithm.
Figure 4B:
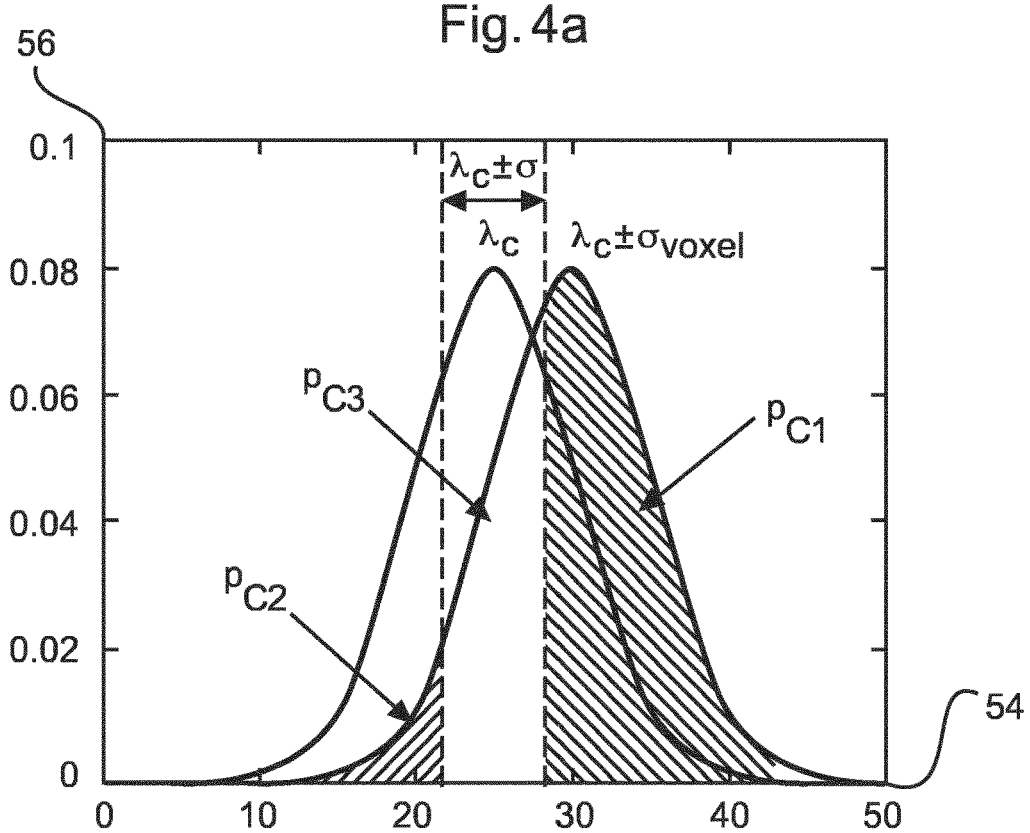

In this example, the probability of each class $p_i$ is calculated based on the assumption that an edge voxel has an intensity of $\lambda_c + \sigma_{voxel}$, and that all intensities follow a normal distribution having $\sigma_{scaling} = 0.5$ FIGS. 4a and 4b illustrate the probabilities of the different classes are shown for $\sigma_{scaling} = 0.5$, for example.

In step (v), the overall conditional probability that a considered pattern belongs to a reference edge pattern (k) is then given by equation (5):

$$p_{edge}(\text{pattern} | \text{reference edge pattern}_k) = \prod_{i=1}^{6} p_{c_i}^{[c_i]} \quad (5)$$

where $[C_i]$ represents the number of voxels found in class $C_i$.

In the optional case that a series of noise models have been applied to the image precursor information, a parallel process to steps (i) to (v) is performed in respect of the applied noise models.

Then, in an optional step, the different ratios of the edge probability to the noise probability for a considered voxel are combined. In an example, this may be achieved by summing the logarithm of the values weighted by probability of a value in the interval $[-\sigma_{scaling}, \sigma_{scaling}]$.

In step (vi), the values derived from the algorithm defined above are then used to locally adapt the edge-preserving parameter $\gamma$ in a regularized reconstruction scheme such as that defined in equation (1).

One approach to locally adapt the edge-preserving parameter $\gamma$ is to apply a value-range limitation to an edge-image of the image precursor information, resulting in a strict value-range limitation (e.g., between 0 and 1).

More specifically, starting from the probability of a pattern (found in the image for a certain $\sigma_{scaling}$ factor $\sigma_i$ under the hypothesis of a model edge $p_{edge,i}$ (calculated after equation 5).

The probability for the pattern under the hypothesis of noise $p_{noise,i}$ is calculated in the same way. Usually, the model noise pattern is flat, so $b_{edge} = 0$.

The probability ratio is then given by equation (6):

$$R_i = \frac{p_{edge,i}}{p_{noise,i}} \quad (6)$$

The probability ratios for all $\sigma_{scaling}$ values are combined to a summed ratio $R_{sum}$. Optionally, this is found according to equation (7):

$$R_{sum} = \frac{\sigma_{max} - \sigma_{min}}{N} \sum_{i=1}^{N} \log(R_i) \cdot p_{\sigma i} \quad (7)$$

With $p_{\sigma i}$ as the probability of finding a value in the interval $[-\sigma_i, \sigma_i]$ given a normal distribution, and $\sigma_{max}$ and $\sigma_{min}$ as the maximum and minimum values of the $\sigma_{scaling}$ factors used.

It will be appreciated that the algorithm detailed in equation (7) is one way to combine the different probability ratios, but that many other algorithms may be applied, for example not using the log or the $p_{oi}$ factor.

The value of the factors $R_i$ and $R_{sum}$ are in the range [−∞, ∞]. In this example, a strict value range limitation is needed to modify the original edge-preservation level parameter γ ($\gamma_{org}$).

Therefore, in the present example, the updated edge-preservation level parameter γ is calculated as equation (8):

$$\gamma = \gamma_{org} \cdot \exp(-R_{sum}) \qquad (8)$$

In an alternative case, the edge-preservation level parameter γ is limited using the sigmoid function class, for example.

The preceding explanation has illustrated how an edge pattern detection approach can be used to derive a continuous edge-preservation level parameter γ capable of providing continuous local modification to the regularizing term of a relative penalty difference scheme based on the likelihood that an arbitrary edge, or noise pattern is present in the neighbourhood of a considered voxel.

The algorithm discussed above has been tested, and shows good results at reducing single "hot-voxel" artefacts, and in reducing variation in homogeneous regions.

Figure 6A:
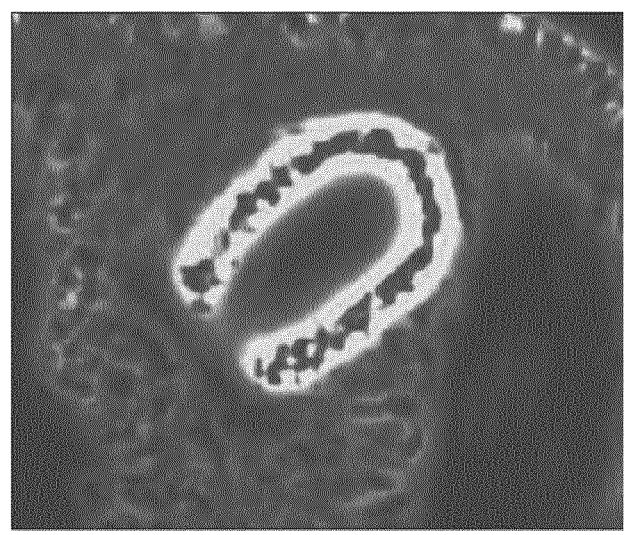
FIG. 6a shows an example of a greyscale heat-map derived from a reconstructed PET image, representing the value of the edge preservation parameter information of an image containing a medical phantom, when a reconstruction algorithm employing continuous, statistically derived edge preservation parameter information derived using an edge pattern detector is used.

FIG. 6a illustrates an example of a physiological phantom in a reconstructed PET image, in which the variable illustrated by the image contrast at each pixel location is the local γ value at that pixel location. A lighter pixel intensity represents a larger value of γ, and a darker pixel intensity represents a smaller value of γ. As implied by equation (1), a larger value of γ will lead to a smaller penalty term being applied to the area of an image precursor having the lighter value in an image reconstruction step.

In FIG. 6a, γ has been calculated along the lines of a method according to the second aspect. It is seen that γ is higher in a very concentrated area close to the edge of the medical phantom. Indeed, the majority of the phantom's horseshoe has a low γ value. This implies that the algorithm is better at distinguishing edge areas of the image.

Figure 6B:
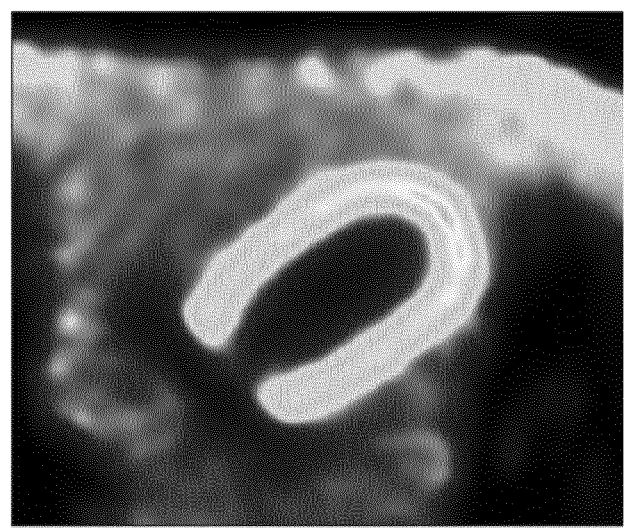
FIG. 6b shows an example of a greyscale heat-map derived from a PET image, representing the value of the edge preservation parameter information of an image containing a medical phantom, when a standard reconstruction algorithm is applied.
Figure 7:
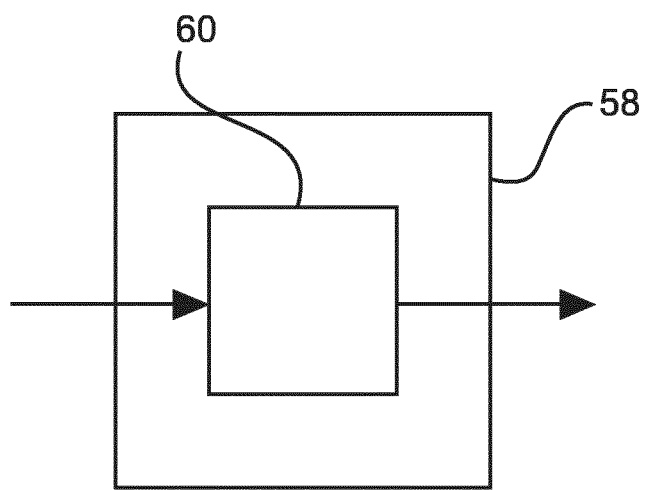
FIG. 7 shows a device according to the first aspect.
Figure 8:
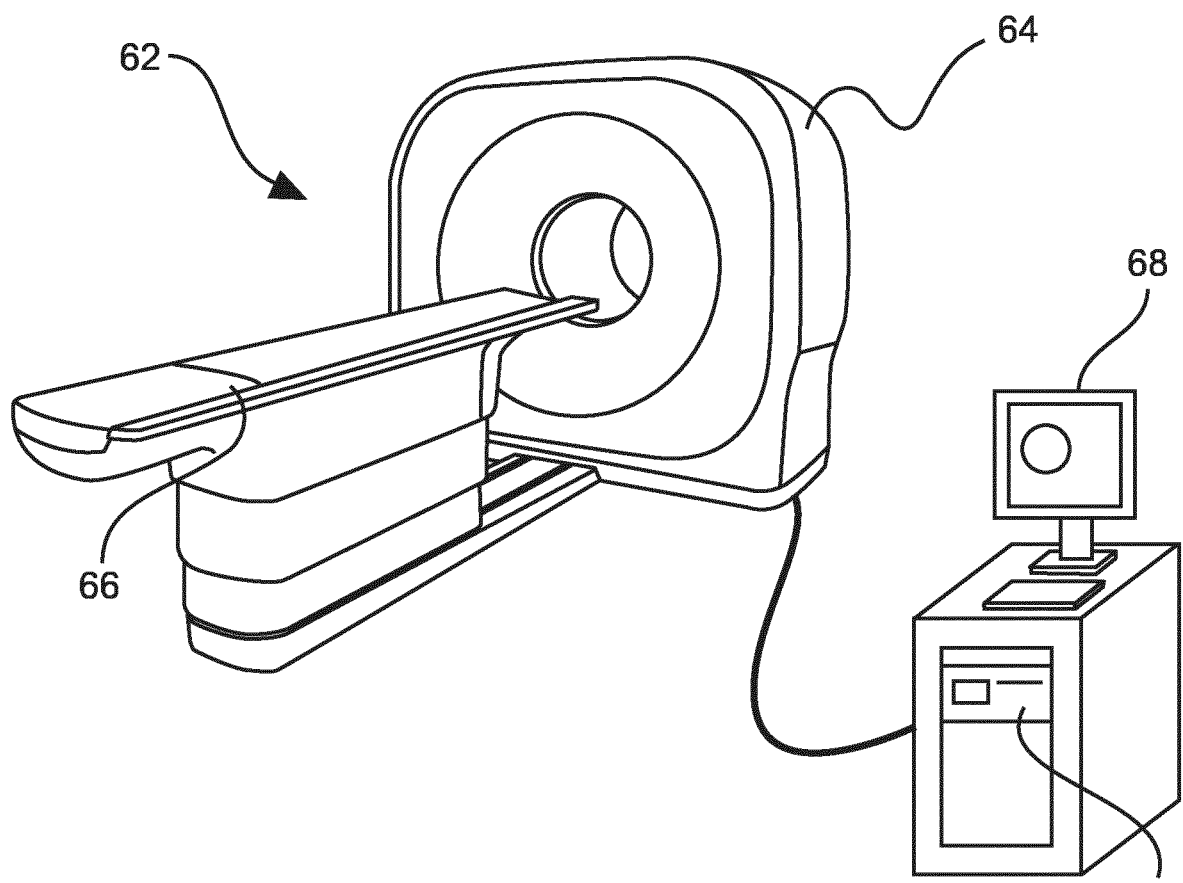
FIG. 8 shows a medical imaging system according to the third aspect.

In FIG. 6b, γ has been calculated along the lines of a standard RDP method. In this case, γ is high across the entire area of the medical phantom, indicating that edge localization using the standard RDP method is poorer.

As an aside, the combination of the local output of the edge pattern detector can be interpreted as an "edge pattern image". Such an image represents the likelihood that a considered voxel represents a physiologically originating "edge" feature in a reconstructed image.

Figure 3:
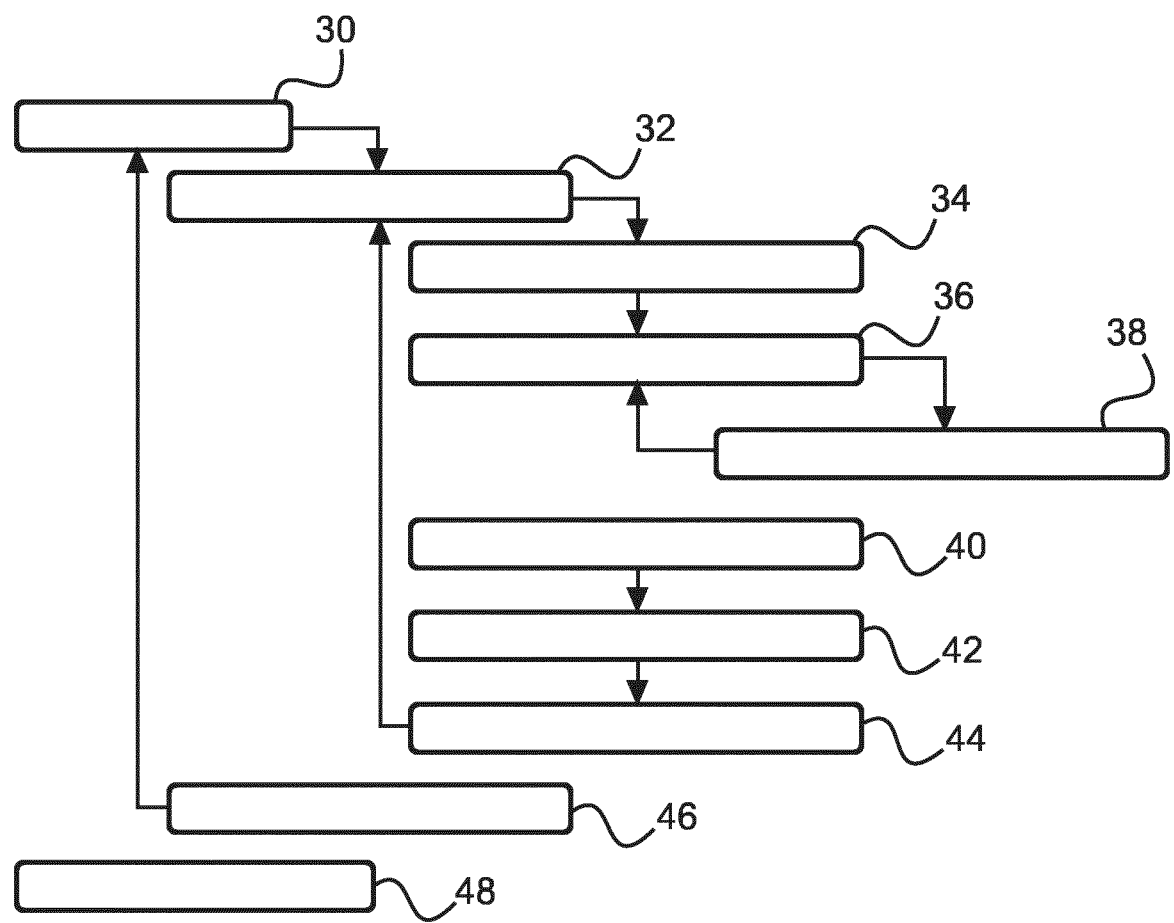
FIG. 3 shows a representative processing algorithm according to an example.

FIG. 3 shows a general procedure to provide an "edge pattern image".

Box 30 represents an iterative process iterating the function of FIG. 30 throughout a set of voxels in an image. Therefore, the processes carried out in boxes 46, 32, and 34 (and connected processes) are performed for each voxel.

At box 32, a general noise variance σ is set for the voxel as the multiple of $\sigma_{voxel}$ and a scaling factor $\sigma_{scaling}$. $\sigma_{voxel}$ indicates the expected variation of the voxel under consideration. The term $\sigma_{voxel}$ can be derived from the image directly (for example, via the square root of the mean value of the neighbouring voxel intensities, or from another measure (e.g. the Fisher information). The scaling factor $\sigma_{scaling}$ can be chosen in a wide range (such as 0-5) dependent on the computational resources available.

At box 34, one or more binary patterns are obtained. The binary pattern is a prototype edge model such as a line, a point, or a corner, for example. Optionally, rotations of binary edge models may be found.

At box 38, the probability that the "current" edge pattern is similar to the current neighbourhood of the voxel under consideration is found. The joint probability of the edge patterns, and optionally transformations, may be derived for each considered voxel to represent a general edge likelihood value.

At box 40, a maximum power of the noise in the image is found.

At box 42, a random pattern, or optionally a plurality of random patterns, is generated based on the maximum power. This random pattern(s) is compared to the neighbourhood of the considered current voxel, and a probability measure is generated characterizing the likelihood that the current voxel represents noise features in the image.

At box 44, the ratio between the likelihood that a current voxel is one of the edge patterns, or noise patterns, is calculated.

At box 46, the probability ratios are summed.

At box 48, a determination is made based on the result of 46 as to whether the voxel under consideration represents an edge, or a noise voxel. Then, a corresponding "edge image" voxel is set, based upon the determination. After iterating through all pixels (voxels), an "edge image" results.

It will be appreciated that the algorithm detailed above has broad applicability to many types of iterative image reconstruction where introduced artificial noise is present. For example, the algorithm also has applicability at least in CT, MRI, and ultrasound systems, and PET/CT approaches, as well as more generally to image reconstruction processing.

According to an embodiment of the second aspect, anatomic information is acquired from an external medical imaging data source, for example from CT data, MRI data, or ultrasound data. The anatomic information is used as an additional prior term in the reconstruction algorithm applied in step e). Therefore, anatomic information may be applied to the image reconstruction process to further increase reconstruction accuracy.

Optionally, in step c), the generation of the edge preservation parameter information as a continuous probability measure is performed by assembling a plurality of logical classes representing the probability that a number of voxels will be found in a particular logical class (for example, as defined in equation (4)).

Optionally, in step c), the generation of the edge preservation parameter information as a continuous probability measure is performed by assembling a plurality of logical classes representing the probability that a number of voxels will be found in a particular logical class (for example, as defined in equation (4)), wherein the number of logical classes is fewer than arithmetically optimal. In other words, the possible space of probability distributions is subsampled. This can reduce the computational complexity of the algorithm.

According to an embodiment of the second aspect, the edge pattern detector is applies one, or more edge models to the image precursor information $\lambda_i$. The edge models comprise a reference edge model which is a prototype spatial distribution model of a subset of image pixels or voxels which can be used to statistically indicate the likelihood of the presence of a feature edge in the image precursor information $\lambda_i$.

Optionally, step b) further comprises generating the edge pattern information by:

b1) obtaining reference edge pattern information based on one or more binary edge patterns; and b2) computing edge detection information by applying the reference edge pattern information to the image precursor information $\lambda_i$.

Accordingly, a more accurate estimate of the likelihood of the presence of an edge is possible, because reference edge patterns of commonly expected edge patterns are provided.

According to an embodiment of the second aspect, step b) further comprises generating the edge pattern information by:

b3) combining the edge pattern information, the difference binary pattern information $b_{diff}$, and the sign binary pattern information $b_{sign}$ to obtain an edge probability measure $p_{edge}$.

The sign binary pattern information $b_{sign}$ distinguishes between a positive and negative difference of each neighbourhood pixel or voxel when compared to the image precursor information $\lambda_i$. The difference binary pattern information $b_{diff}$ distinguishes pixels having a intensity difference relative to a central pixel or voxel in the neighbourhood pixels or voxels which is greater than a difference threshold.

Accordingly, the estimate of the likelihood of the presence of an edge is made more accurate by incorporating a number of different logical classes into a classification procedure.

According to an embodiment of the second aspect, step b) further comprises generating a plurality of classes comprising pixel or voxel incidence information for each class. Each class of the plurality of classes is formed based on a logical combination of matching bits of at least two of the edge pattern information, the difference binary pattern information $b_{diff}$, and sign binary pattern information $b_{sign}$.

Accordingly, the estimate of the likelihood of the presence of an edge is made more accurate by incorporating a number of different logical classes into a classification procedure.

Optionally, step b) further comprises:

b4) generating a plurality of classes comprising pixel or voxel incidence information for each class, wherein each class of the plurality of classes comprises a logical combination of the edge pattern information, the difference binary pattern information $b_{diff}$, and sign binary pattern information $b_{sign}$; and b5) generating the edge probability measure $p_{edge}$ as a sum of the probabilities of each class of the plurality of classes.

According to an embodiment of the second aspect, step b) further comprises generating an edge probability measure $p_{edge}$ based on the number of pixels or voxels in each class of the plurality of classes, and the probability of each class.

Accordingly, the probability distributions of various combinations of logical classes of possible voxels are sampled, leading to a more accurate measure of edge probability.

Optionally, step b) further comprises:

b6) generating a plurality of classes comprising pixel or voxel incidence information for each class, wherein each class of the plurality of classes comprises a logical combination of the edge pattern information, the difference binary pattern information $b_{diff}$, and sign binary pattern information $b_{sign}$; and generating the edge probability measure $p_{edge}$ as a sum of the probabilities of each class of the plurality of classes.

According to an embodiment of the second aspect, step b) further comprises:

b7) calculating the edge preservation parameter information $\gamma$ using the edge probability measure $p_{edge}$.

Accordingly, the edge preservation parameter is a locally varying continuous quantity statistically liked to the likelihood of an edge being present at a local point of an image.

According to an embodiment of the second aspect, step b) further comprises:

b8) obtaining a plurality of reference noise patterns as the noise pattern information; and b9) generating edge preservation parameter information $\gamma$ by combining the plurality of reference noise patterns with the edge pattern information.

Accordingly, a more accurate estimate of the edge probability is provided, because noise in the image is modelled in the estimate.

According to an embodiment of the second aspect, step b) further comprises:

generating, for elements of the image precursor information $\lambda_i$, a noise probability value $p_{noise}$ as the sum of the products of the noise probabilities of respective classes $C_i$ of the plurality of classes, and their noise probabilities $p_n$.

Accordingly, the noise model is sampled using the same logical classes as those used for the edge probabilities.

According to an embodiment of the second aspect, step b) further comprises:

b10) generating the edge preservation parameter information $\gamma$ by finding, for each pixel or voxel, the probability ratio $R_i$ of the probability of an edge to the probability of noise; and b11) summing the probability ratio $R_i$ to form a summed ratio $R_{sum}$ as initial edge preservation parameter information $\gamma_1$;

Accordingly, the edge preservation parameter information is derived using an estimate of the edge probability to the noise probability.

According to an embodiment of the second aspect, step b) further comprises:

b12) limiting the initial edge preservation parameter information $\gamma_1$ using an exponential or a sigmoid function to form the edge preservation parameter information $\gamma$.

According to a first aspect of the invention, there is provided a device for artificial noise suppression in iterative image reconstruction. The device comprises a processing unit.

The processing unit is configured to acquire image precursor information, to generate (i) edge pattern information of the image precursor information using an edge pattern detector, and (ii) noise pattern information, and to generate edge preservation parameter information based on the edge pattern information, the noise pattern information, and the image precursor information.

The edge preservation parameter information is based on a continuous probability measure. The processing unit is configured to generate a regularization function, wherein the regularization function is locally adjusted using the edge preservation parameter information, and to generate reconstructed image information by applying an image reconstruction algorithm to the image precursor information.

The image reconstruction algorithm applies the regularization function R to the image precursor information $\lambda_i$, thus providing reconstructed image information $\lambda_{i+1}$ in which noise-correlated features of the image precursor information $\lambda_i$ have been filtered more strongly than edge-correlated features of the image precursor information $\lambda_i$.

Therefore, large local voxel differences in an image originating from clustered noise speckles (which are not wanted in a final image) may be removed, whilst at the same time, small local voxel differences representing physiologically significant edge features (which are wanted in an final image) may be preserved. A statistical model is used to determine how well a found pattern matches a general feature (edge) model and noise model, which also considers local statistical variations in the image precursor information. The use of a statistical model enables the edge preservation parameter information to be a continuous function, because the edge preservation parameter information may be, for example, sampled from one or more probability density functions.

Thus, a more accurate distinction between clustered noise speckles and physiology-based features is possible.

Further embodiments of the first aspect are discussed in the statement of invention.

According to a third aspect of the invention, a medical imaging system is provided. The system comprises:
  a patient imaging arrangement;
  a display unit; and
  a device for artificial noise suppression in iterative image reconstruction as defined in the first aspect, or its embodiments.

The patient imaging arrangement comprises an imaging sensor configured to provide image information of a region of interest of a patient to the device for image reconstruction.

The display unit is configured to display reconstructed image information output by the device for image reconstruction.

Therefore, a medical imaging system providing a more accurate distinction between clustered noise speckles and physiology-based features is provided.

According to a fourth aspect of the invention, there is provided a computer program element for controlling a device for image reconstruction according to the first aspect, or one of its embodiments, which, when the computer program element is executed by a control unit, is adapted to perform the steps of the second aspect, or one of its embodiments.

According to a fifth aspect of the invention, there is provided a computer readable medium having stored the program element the fourth aspect.

It will be noted that the above-stated method steps may also be executed in a different order. For example, the medical image data may be received from the image detector of a C-arm imaging arrangement before the orientation of the C-arm imaging is received.

In another aspect of the present invention, a computer program, or a computer program element, is provided that is characterized by being adapted to execute the method steps of the method of the second aspect, or its embodiments, as discussed according to one of the preceding embodiments, on an appropriate system.

The computer program element might therefore be stored on a computer unit, which might also be part of an embodiment of the present invention. This computing unit may be adapted to perform or induce a performance of the steps described above. Moreover, it may be adapted to operate the components of the above-described apparatus. The computing unit can be adapted to operate automatically, and/or to execute the orders of a user. A computer program may be loaded into the working memory of a data processor. The data processor may, thus, be equipped to carry out the method of the second aspect.

This exemplary embodiment of the invention covers both a computer program which is configured to use the invention initially, or a computer program that is configured from an existing program into a program that uses the invention by means of a software update, for example.

The computer program element is thus able to provide all necessary steps necessary to fulfill the procedure required according to the second aspect discussed above.

According to a further exemplary embodiment of the present invention, a computer readable medium, such as a CD-ROM, is presented; wherein the computer readable medium has a computer readable medium has a computer program element stored on it, wherein the computer program element is described in the previous section.

A computer program may be stored and/or distributed on a suitable medium, such as an optical storage medium or a solid-state medium supplied together with, or as part of other hardware. The computer readable medium may also be distributed in other forms, such as via the internet, or other wired or wireless telecommunication systems.

The computer program can also be presented over a network like the World Wide Web, and can be downloaded into the working memory of a data processor from such a network. According to a further exemplary embodiment of aspects of the present invention, a medium for making a computer program element available for downloading is provided, which computer program element is arranged to perform a method according to one of the previously described embodiments of the invention.

It should be noted that embodiments of the invention are described with reference to different subject-matter. In particular, some embodiments are described with reference to method-type features, whereas other embodiments are described with respect to apparatus-type features. A person skilled in the art will gather from the above, and following description, that, unless otherwise notified, in addition to any combination of features belonging to one type of subject-matter, also any combination of features belonging to one type of subject-matter, also any combination between features relating to different subject-matter is considered to be disclosed within this application. All features can be combined to provide a synergetic effect, which is more than the simple summation of the features.

Whilst the invention has been illustrated and described in detail in the drawings and the foregoing description, such illustration and description are to be considered to be illustrative or exemplary, and not restrictive. The invention is not limited to the disclosed embodiments. Other variations to the disclosed embodiments can be understood, and effected, by those skilled in the art in practicing the claimed invention, from a study of the disclosure in the drawings, the description, and the dependent claims.

In the claims, the word "comprising" does not exclude other elements or steps. The indefinite article "a" or "an" does not exclude a plurality. A single processor, or other unit, may fulfill the functions of several items recited in the claims. The mere fact that certain measures are recited in mutually different dependent claims does not indicate that a combination of these measures cannot be used to advantage.

Any reference signs in the claims should not be construed as limiting the scope of the claims.

The invention claimed is:

1. A device for artificial noise suppression in iterative image reconstruction, wherein the device comprises:
  a processing unit;
  wherein the processing unit is configured to: acquire image precursor information, to generate (i) edge pattern information of the image precursor information using an edge pattern detector, and (ii) noise pattern information, to generate edge preservation parameter information based on the edge pattern information, the noise pattern information, and the image precursor information,
  wherein the edge preservation parameter information is based on a continuous probability measure, wherein the processing unit is configured to generate a regularization function,
which is locally adjusted using the edge preservation parameter information, and to generate reconstructed image information by applying an image reconstruction algorithm to the image precursor information,
wherein the image reconstruction algorithm applies the regularization function to the image precursor information, thus providing reconstructed image information in which noise-correlated features of the image precursor information have been filtered more strongly than edge-correlated features of the image precursor information.

2. The device of claim 1,
wherein the edge pattern detector is configured to apply one, or more edge models to the image precursor information to generate the edge pattern information, wherein the edge models comprise a reference edge model which is a prototype spatial distribution model of a subset of image pixels or voxels which can be used to statistically indicate the likelihood of the presence of a feature edge in the image precursor information.

3. The device of claim 1, wherein the processing unit is further configured to:
generate the edge pattern information by computing sign binary pattern information from the image precursor information; and difference binary pattern information from the image precursor information;
wherein the sign binary pattern information distinguishes between a positive and negative difference of each neighbourhood pixel or voxel when compared to the image precursor information, and wherein the difference binary pattern information distinguishes pixels or voxels having a intensity difference relative to a central pixel or voxel in the neighbourhood pixels or voxels which is greater than a difference threshold.

4. The device of claim 3, wherein the processing unit is further configured to:
generate a plurality of classes comprising pixel or voxel incidence information for each class, wherein each class of the plurality of classes is formed based on a logical combination of matching bits of at least two of the edge binary pattern information, the difference binary pattern information, and the sign binary pattern information.

5. The device of claim 4, wherein the processing unit is further configured to:
generate an edge probability measure based on the number of pixels or voxels in each class of the plurality of classes, and the probability of each class.

6. The device according to claim 4, wherein the processing unit is further configured to:
calculate the edge preservation parameter information using the edge probability measure.

7. The device according to claim 1, wherein the processing unit is further configured to:
obtain a plurality of reference noise patterns as the noise pattern information; and wherein the edge preservation parameter information is generated additionally by combining the plurality of reference noise patterns with the edge pattern information.

8. The device according to claim 5, wherein the processing unit is further configured to:
generate, for elements of the image precursor information, a noise probability value as the sum of the products of the noise probabilities of respective classes of the plurality of classes, and their noise probabilities.

9. The device according to claim 8, wherein the processing unit is further configured to generate the edge preservation parameter information by finding, for each pixel or voxel, the probability ratio of the probability of an edge to the probability of noise; and to sum the probability ratio to form a summed ratio as initial edge preservation parameter information.

10. The device according to claim 9, wherein the processing unit is further configured to:
limit initial edge preservation parameter information using an exponential or a sigmoid function to form the edge preservation parameter information.

11. A method for artificial noise suppression in iterative image reconstruction, comprising:
a) acquiring image precursor information;
b) generating (i) edge pattern information of the image precursor information using an edge pattern detector, and (ii) noise pattern information;
c) generating edge preservation parameter information based on the edge pattern information, the noise pattern information, and the image precursor information, wherein the edge preservation parameter information is based on a continuous probability measure;
d) generating a regularization function, which is locally adjusted using the edge preservation parameter information; and
e) generating reconstructed image information by applying an image reconstruction algorithm to the image precursor information,
wherein the image reconstruction algorithm applies the regularization function to the image precursor information, thus providing reconstructed image information in which noise-correlated features of the image precursor information have been filtered more strongly than edge-correlated features of the image precursor information.

12. The method according to claim 11,
wherein the edge pattern information is generated by using the edge pattern detector to apply one, or more edge models to the image precursor information, wherein the edge models comprise a reference edge model which is a prototype spatial distribution model of a subset of image pixels or voxels which can be used to statistically indicate the likelihood of the presence of a feature edge in the image precursor information.

13. A non-transitory computer program element for controlling a device for image reconstruction, which, when the computer program element is executed by a control unit, is adapted to perform the steps of claim 11.

14. A non-transitory computer readable medium having stored the program element of claim 13.

* * * * *